United States Patent
Liu et al.

(10) Patent No.: US 12,455,803 B2
(45) Date of Patent: Oct. 28, 2025

(54) ACTIVATING AND DEACTIVATING A PRE-INITIALIZATION ENVIRONMENT TUNING

(71) Applicant: International Business Machines Corporation, Armonk, NY (US)

(72) Inventors: Dong Hui Liu, Beijing (CN); Peng Hui Jiang, Beijing (CN); Jing Lu, Beijing (CN); Naijie Li, Beijing (CN); Jun Su, Beijing (CN); Xiao Yan Tang, Beijing (CN); Jia Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/400,020

(22) Filed: Dec. 29, 2023

(65) Prior Publication Data
US 2025/0217260 A1    Jul. 3, 2025

(51) Int. Cl.
*G06F 11/34* (2006.01)
*G06F 11/30* (2006.01)

(52) U.S. Cl.
CPC ...... *G06F 11/3476* (2013.01); *G06F 11/3051* (2013.01); *G06F 11/3447* (2013.01)

(58) Field of Classification Search
None
See application file for complete search history.

(56) References Cited

U.S. PATENT DOCUMENTS

| | | |
|---|---|---|
| 8,370,843 B1 | 2/2013 | Bailey et al. |
| 9,116,755 B2 | 8/2015 | Jackson |
| 9,977,691 B2 | 5/2018 | Marriner et al. |

(Continued)

OTHER PUBLICATIONS

Chen, "Ensemble: A Tool for Performance Modeling of Applications in Cloud Data Centers", IEEE Transactions on Cloud Computing, Aug. 2015, 14 pages.

(Continued)

*Primary Examiner* — Qing Chen
(74) *Attorney, Agent, or Firm* — Scully, Scott, Murphy & Presser, P.C.; Jared Chaney

(57) ABSTRACT

Pre-initialization environments are generated on at least one hardware processor for running incoming applications. Resource usage of resources configured for the pre-initialization environments in running the incoming applications is monitored. Automatic tuning of a pre-initialization environment among the pre-initialization environments is deactivated, responsive to determining based on the resource usage of resources configured for the pre-initialization environment, that the pre-initialization environment is maintaining a threshold level of efficiency. Automatic tuning of the pre-initialization environment among the pre-initialization environments is activated, responsive to determining based on the resource usage of resources configured for the pre-initialization environment, that the pre-initialization environment is overloaded. Automatic tuning of the pre-initialization environment among the pre-initialization environments is activated, responsive to determining, based on the resource usage of resources configured for the pre-initialization environment, that the pre-initialization environment is idle.

17 Claims, 11 Drawing Sheets

(56) References Cited

U.S. PATENT DOCUMENTS

| | | |
|---|---|---|
| 10,009,292 B2 | 6/2018 | Dunbar et al. |
| 10,303,492 B1 | 5/2019 | Wagner et al. |
| 10,437,629 B2 | 10/2019 | Wagner et al. |
| 10,587,464 B2 | 3/2020 | Coronado et al. |
| 10,725,885 B1* | 7/2020 | Paraschiv ............ G06F 11/3433 |
| 11,126,469 B2 | 9/2021 | Reque et al. |
| 11,237,898 B2 | 2/2022 | Estrada et al. |
| 2006/0184935 A1* | 8/2006 | Abels ................... G06F 9/5077 |
| | | 718/1 |
| 2006/0184936 A1* | 8/2006 | Abels ................... G06F 9/5077 |
| | | 718/1 |
| 2006/0184937 A1* | 8/2006 | Abels ....................... G06F 8/65 |
| | | 718/1 |
| 2012/0167122 A1* | 6/2012 | Koskimies ............ G06F 9/5027 |
| | | 719/328 |
| 2014/0075019 A1 | 3/2014 | Mordani et al. |
| 2014/0258446 A1* | 9/2014 | Bursell ............... G06F 9/45558 |
| | | 709/217 |
| 2015/0143367 A1* | 5/2015 | Jia ...................... G06F 9/45558 |
| | | 718/1 |
| 2016/0162317 A1* | 6/2016 | Doherty ............... G06F 11/301 |
| | | 718/1 |
| 2018/0024860 A1* | 1/2018 | Balle ........................ G06F 8/65 |
| 2019/0163538 A1 | 5/2019 | Klein et al. |
| 2021/0165677 A1* | 6/2021 | Gritter ............... G06F 9/45558 |
| 2023/0280996 A1* | 9/2023 | Torres ...................... G06F 8/72 |
| 2024/0112790 A1* | 4/2024 | Boonn ................... G16H 40/20 |

OTHER PUBLICATIONS

Disclosed Anonymously, "A Method to Manage Containerized Pre-Initialization Environment", An IP.com Prior Art Database Technical Disclosure, IP.com No. IPCOM000264017D, Nov. 1, 2020, 3 pages.

* cited by examiner

ACTIVATING AND DEACTIVATING A PRE-INITIALIZATION ENVIRONMENT TUNING

BACKGROUND

The present application relates generally to computers and computer applications, and more particularly to computer environment tuning and dynamically enabling and deactivating pre-initialization environment tuning.

BRIEF SUMMARY

The summary of the disclosure is given to aid understanding of a computer system and method of enabling and/or deactivating pre-initialization environment tuning, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

In some embodiments, a computer-implemented method includes generating pre-initialization environments on at least one hardware processor for running incoming applications. The method also includes monitoring resource usage of resources configured for the pre-initialization environments in running the incoming applications. The method also includes deactivating automatic tuning of a pre-initialization environment among the pre-initialization environments responsive to determining based on the resource usage of resources configured for the pre-initialization environment that the pre-initialization environment is maintaining a threshold level of efficiency. The method also includes activating automatic tuning of the pre-initialization environment among the pre-initialization environments responsive to determining based on the resource usage of resources configured for the pre-initialization environment that the pre-initialization environment is overloaded. The method also includes activating automatic tuning of the pre-initialization environment among the pre-initialization environments responsive to determining, based on the resource usage of resources configured for the pre-initialization environment, that the pre-initialization environment is idle.

In some embodiments, a system includes at least one computer processor. The system also includes at least one memory device coupled with the at least one computer processor. The at least one computer processor is configured to generate pre-initialization environments on at least one hardware processor for running incoming applications. The at least one computer processor is also configured to monitor resource usage of resources configured for the pre-initialization environments in running the incoming applications. The at least one computer processor is also configured to deactivate automatic tuning of a pre-initialization environment among the pre-initialization environments responsive to determining based on the resource usage of resources configured for the pre-initialization environment that the pre-initialization environment is maintaining a threshold level of efficiency. The at least one computer processor is also configured to activate automatic tuning of the pre-initialization environment among the pre-initialization environments responsive to determining based on the resource usage of resources configured for the pre-initialization environment that the pre-initialization environment is overloaded. The at least one computer processor is also configured to activate automatic tuning of the pre-initialization environment among the pre-initialization environments responsive to determining, based on the resource usage of resources configured for the pre-initialization environment, that the pre-initialization environment is idle.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
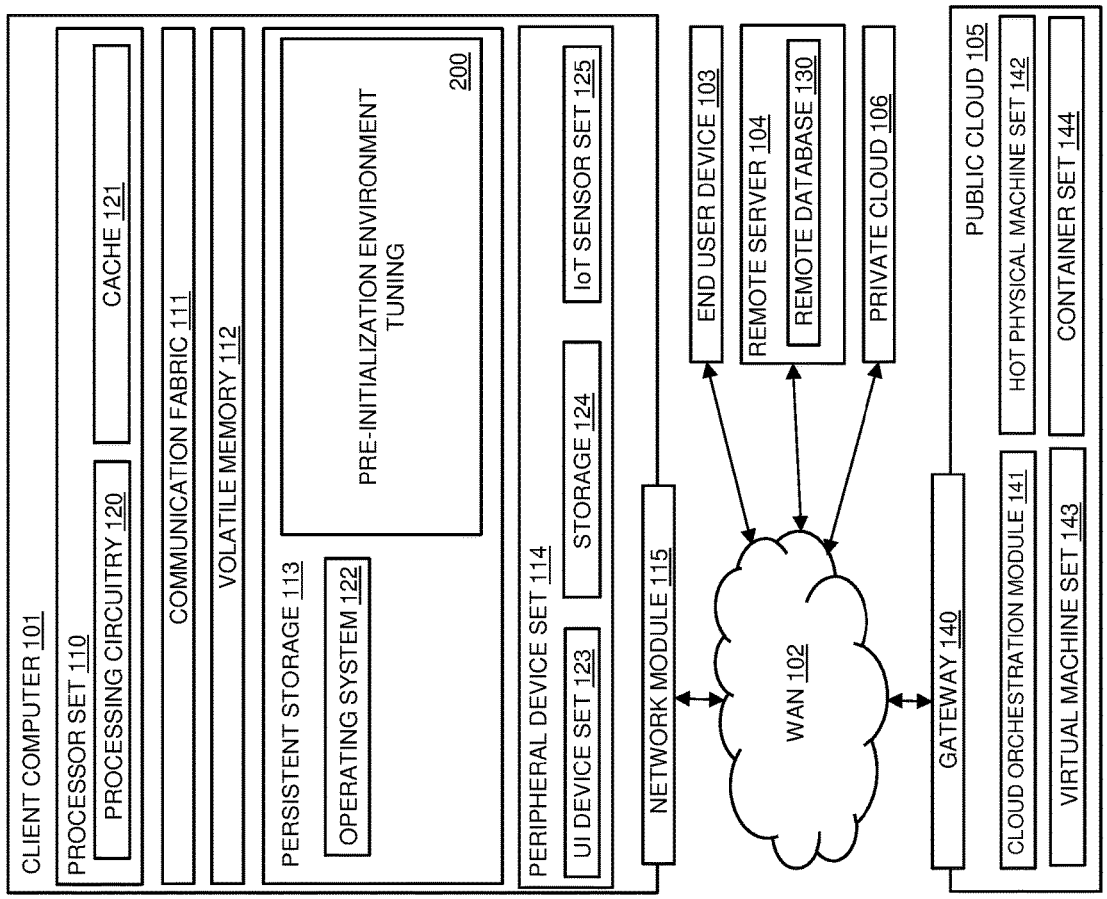
FIG. 1 shows an example of a computing environment, which can implement pre-initialization environment tuning in some embodiments.

In some embodiments, a computer-implemented method includes generating pre-initialization environments on at least one hardware processor for running incoming applications. The method also includes monitoring resource usage of resources configured for the pre-initialization environments in running the incoming applications. The method also includes deactivating automatic tuning of a pre-initialization environment among the pre-initialization environments responsive to determining based on the resource usage of resources configured for the pre-initialization environment that the pre-initialization environment is maintaining a threshold level of efficiency. The method also includes activating automatic tuning of the pre-initialization environment among the pre-initialization environments responsive to determining based on the resource usage of resources configured for the pre-initialization environment that the pre-initialization environment is overloaded. The method also includes activating automatic tuning of the pre-initialization environment among the pre-initialization environments responsive to determining, based on the resource usage of resources configured for the pre-initialization environment, that the pre-initialization environment is idle.

Enabling or activating of automatic tuning of pre-initialization environments, for example, dynamically and timely, enhances performance, improves energy efficiency and reduces costs of allocating resources. Such resources can further be allocated to other processes, where needed, further speeding up processing of those other processes.

One or more of the following features can be separable or optional from each other. In some embodiment, the pre-initialization environments are generated according to label distributions of performance metrics learned by machine learning models based on historic performance data of past applications. Such automatic method of determining appropriate pre-initialization environment configurations allows for efficient use of resources in a computing environment.

In some embodiments, the resource usage of resources configured for the pre-initialization environments in running the incoming applications, are monitored iteratively, and the deactivating and the activating of the automatic tuning occur dynamically over time. For instance, iteratively (e.g., continually or continuously) monitoring the pre-initialization environments allows for timely adjustment to be made to the affected pre-initialization environments, and maintains efficiency in running a computer system.

In some embodiments, the method further includes running machine learning models using features associated with the incoming applications to predict performance index associated with each of the incoming applications, and based on mapping of the predicted performance index of an incoming application with resource configuration of the pre-initialization environment, routing the incoming application to the pre-initialization environment for the application to run in the pre-initialization environment. In this way, for example, applications can be run on pre-initialization environments that have appropriate resources for the applications to run.

In some embodiments, the activating of the automatic tuning removes the pre-initialization environment that is determined to be idle, among the pre-initialization environments. In this way, for example, cost of running resources can be reduced.

In some embodiments, the activating of the automatic tuning creates an additional instance of the pre-initialization environment that is determined to be overloaded. In this way, for example, applications can be unloaded from the overloaded pre-initialization environment and run on a newly created additional instance, allowing the overall computer environment to maintain stability and balance.

In some embodiments, the deactivating and the activating of automatic tuning of pre-initialization environments are performed based on user entered rules. In this way, for example, users are allowed to configure pre-initialization environments according to the users' needs and goals for the users' applications and pre-initialization environments running the applications.

A system including at least one computer processor and at least one memory device coupled with the at least one computer processor is also disclosed, where the at least one computer processor is configured to perform one or more methods described above. A computer program product is also disclosed that includes a computer readable storage medium having program instructions embodied therewith, where the program instructions are readable by a device to cause the device to perform one or more methods described above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as pre-initialization environment tuning algorithm code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Pre-initialization environment refers to a computing environment having hardware and/or software resources configured for running one or more applications or workload, e.g., providing a runtime environment for one or more applications. Pre-initialization environment can be a virtual machine and can be instantiated and terminated when its use is done. For example, a pre-initialization environment is created as a runtime instance that runs on a computer or one or more hardware processors. Pre-initialization environment can be created to perform multiple runs of an application.

Pre-initialization environment tuning refers to changing runtime options or configurations of a pre-initialization environment. Each runtime has runtime options such as heap size, stack size, other capacities such as CPU, memory, storage, and/or other hardware and/or software configurations.

A pre-initialization environment of a computer system facilities the creating and initializing of a common runtime environment. Applications can be run within the pre-initialized environment, and once the use is done, the pre-initialized environment can be terminated. A pre-initialization environment is commonly used to enhance performance for repeated invocations of an application or for a complex application where there are many repetitive requests and where a relatively fast response is required.

A pre-initialization environment can be located in a single geographic location or located in multiple, distinct geographic locations, e.g., interconnected via private or public communication networks. Specifically, a pre-initialization environment manager or pre-initialization environment processing center, herein generally referred to as a "data center," may include a number of inter-connected pre-initialization environment to provide computing resources to users of the data center.

To facilitate increased utilization of data center resources, technologies allow a single point to host one or more instances of pre-initialization environment that appear and operate as an independent, pre-initialization environment in use of a data center. With this, the single point can create, maintain, delete, or otherwise manage, a pre-initialization environment in a dynamic manner.

In some scenarios, pre-initialization environment instances (e.g., runtime of virtual machines) may be configured according to a number of virtual machine instance types to provide specific functionalities. For example, various pre-initialization environment may be associated with different combinations of operating systems or operating system configurations, virtualized hardware resources and software applications to enable a pre-initialization environment to provide different desired functionalities, or to provide similar functionalities more efficiently.

When provisioning and managing pre-initialization environment that are factors to take into consideration such as stability, balancing workload, and tuning settings. For instance, regarding stability, a pre-initialization environment should operate with a level of stability to ensure smooth execution of the workloads. It can become challenging to identify the right time for enabling and/or deactivating of tuning against a pre-initialization environment. If the tuning of the pre-initialization environment is not designed to be stable, it may result in additional costs, energy consumptions, performance issues and shocks to the pre-initialization environment. With respect to balancing workloads and tuning settings, it can be challenging to accurately balance between workloads and tuning settings, for the pre-initialization environment, especially for complex systems. If the pre-initialization environment is running efficiently, enabling tuning against it may cause decrease in performance and unnecessary expenses, which are not expected. On the other hand, if the pre-initialization environment is not busy or is even idle, it may result in mismatching between performance options and workloads, which may lead to unreasonable environment management and wasted resources.

In some embodiments, a method is provided that enhances performance, improves energy efficiency, and reduces costs by dynamically enabling and deactivating pre-initialization tuning. A system that can perform such a method is also provided. By automatically tuning (auto-tuning) in various stages, multiple pre-initialization environment tuning can be automatically enabled and/or deactivated based on the status of the pre-initialization environment and input workload changes. The method provides for technical improvement for pre-initialization environment management, for example, whether it is deployed in a cloud environment or in a standalone computer environment.

A method in some embodiments dynamically enables and deactivates pre-initialization tuning according to pre-initialization environment instances in a pre-initialization pool. The method in some embodiments uses pre-initialization analyzed result for instances in pre-initialization environment pool. The method analyzes an application information and generates a pre-initialization environment metrics collector to collect resource usage of instances in the pre-initialization pool. The method uses a pre-initialization analyzer to analyze the metrics (e.g., resource usage of the pre-initialization instances) and to label the pre-initialization instances in the pre-initialization pool according to their resource usage. When the pre-initialization environment is idle or has few applications running on it (e.g., less than a threshold number), the method determines that the current performance option may not be suitable for the current workload, and marks that pre-pre-initialization environment as being "idle." If the pre-initialization environment instance is used efficiently, the method determines that the current performance option is suitable for the workload, and marks the pre-initialization environment as being "normal." If the pre-initialization environment instance is overly used, the method determines that the current performance option is not suitable for the workload, and marks the pre-initialization environment instance being "overheated" or "overheat". The method in some embodiments uses a pre-initialization environment usage analyzer to instruct pre-initialization enabler/deactivator to enable or deactivate the pre-initialization environment instance in the pre-initialization pool according to one or more rules. Such one or more rules can be pre-configured. The method in some embodiments enables auto-tuning of the pre-initialization environment instances having overheated and idle labels to optimize performance. The method in some embodiments deactivates auto-tuning of the pre-initialization environment instance having the normal label to pin (e.g., maintain) these pre-initialization environment instances in the pre-initialization pool. The method in some embodiments regularly monitors the workload and adjusts the status (e.g., idle, overheated, normal) of pre-initialization environment instances in the pre-initialization pool to adjust the tuning settings to ensure optimal performance and energy efficiency.

Figure 2:
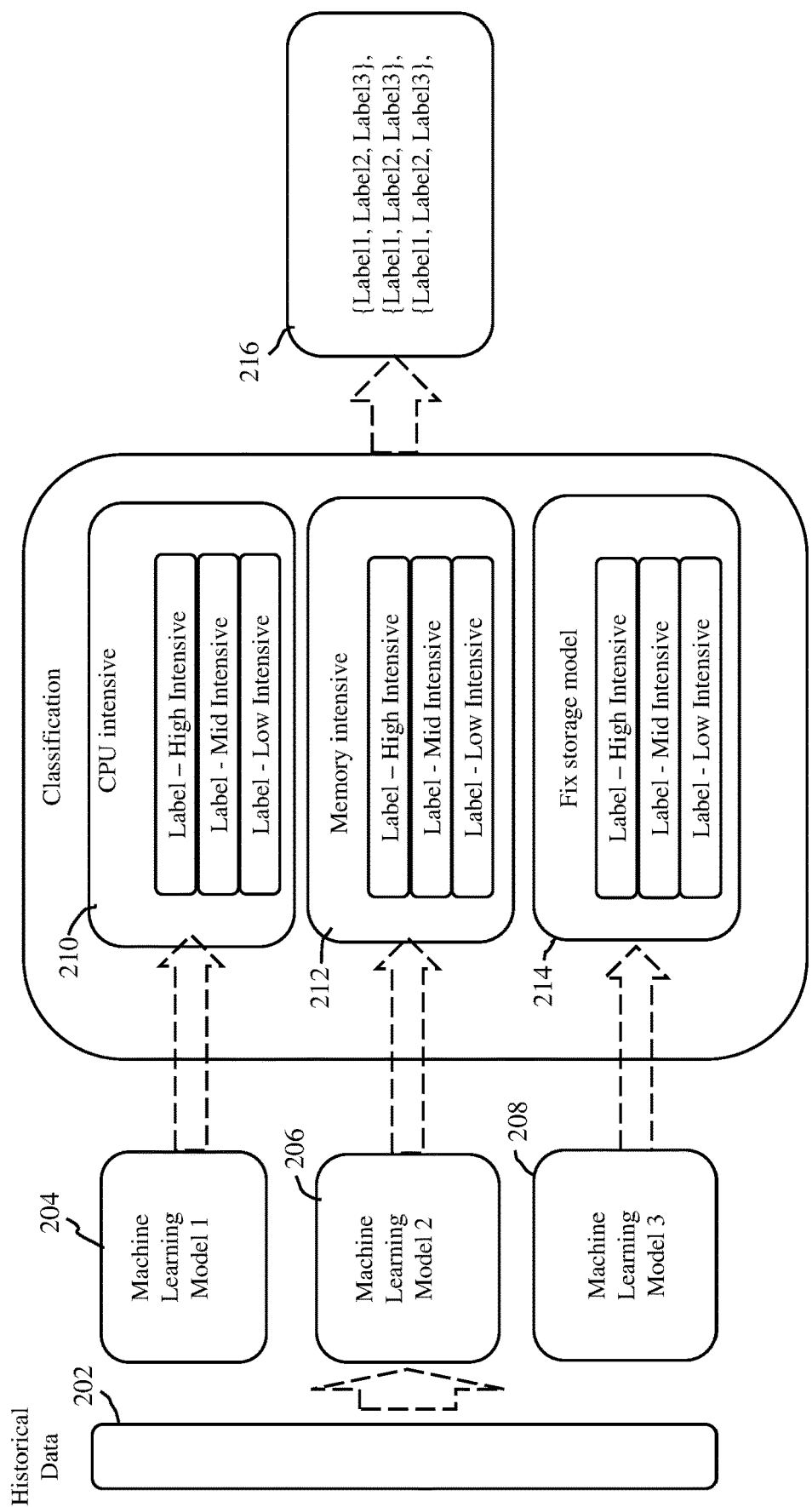
FIG. 2 is a diagram illustrating components for building performance metrics in some embodiments.

FIG. 2 is a diagram illustrating components for building performance metrics in some embodiments. A method for example collects historic data 202 related to applications such as applications' usage of central processing unit (CPU), memory and fixed storage. Feature engineering can be performed on the historic data 202 to extract such metrics data. The method learns label distributions to build performance metrics. For example, machine learning models 204, 206, 208 can be trained to classify the historic data into classes of resource usage or intensity. Consider for example, resources of interest are CPU, memory and fixed storage. A machine learning model 204 is trained to classify the historical data 202 into classes of CPU usage or intensity 210, e.g., different labels of CPU usage or intensity such as high intensive, mid or medium intensive, low intensive as related to CPU usage. A machine learning model 206 is trained to classify the historical data 202 into classes of memory usage or intensity 212, e.g., different labels of memory usage or intensity such as high intensive, mid intensive, low intensive as related to memory usage. A machine learning model 208 is trained to classify the historical data 202 into classes of fixed storage usage or intensity 214, e.g., different labels of fixed storage usage or intensity such as high intensive, mid intensive, low intensive as related to memory usage. For instance, in some embodiments, multiple machine learning models are trained and used to classify an application performance index. Performance index provides a measure of performance or usage of a resource such as CPU, memory, storage, heap size, stack size, and/or others, by an application. The learned label distributions can be used to build an application performance matrix 216. Label distributions indicate different values of a resource. Performance matrix 216 is used as a layout to create a pre-initialization environment. For instance, an application can have 3 class labels, each label relating to a category or intensity of resource. For example, an application can have a label of "CPU High Intensive", a label of "Memory Mid Intensive", a label of "Fixed Storage Low Intensive." Another application can have a label of "CPU Low Intensive", a label of "Memory Low Intensive" a label of "Fixed Storage High Intensive."

In this example scenario, a pre-initialization environment can represent three dimensions of performance index, e.g., CPU, memory and fixed storage. A pre-initialization environment has 3 labels of index per dimension, and therefore, in this example scenario, there are 3^3 or 27 performance scenarios. While the description illustrates three dimensions and three values per dimension, there can be any other number of dimensions, e.g., n-dimensions. Similarly, there can be any other number of values per dimension, e.g., m-values.

In some embodiments, a machine learning model is built for each performance dimension of interest. For example, there can be three machine learning models for 3 dimensions of interest. The machine learning models can be trained using the historical data and applications' metadata. The machine learning models are also used to route applications to most suitable pre-initialization pools.

Figure 3:
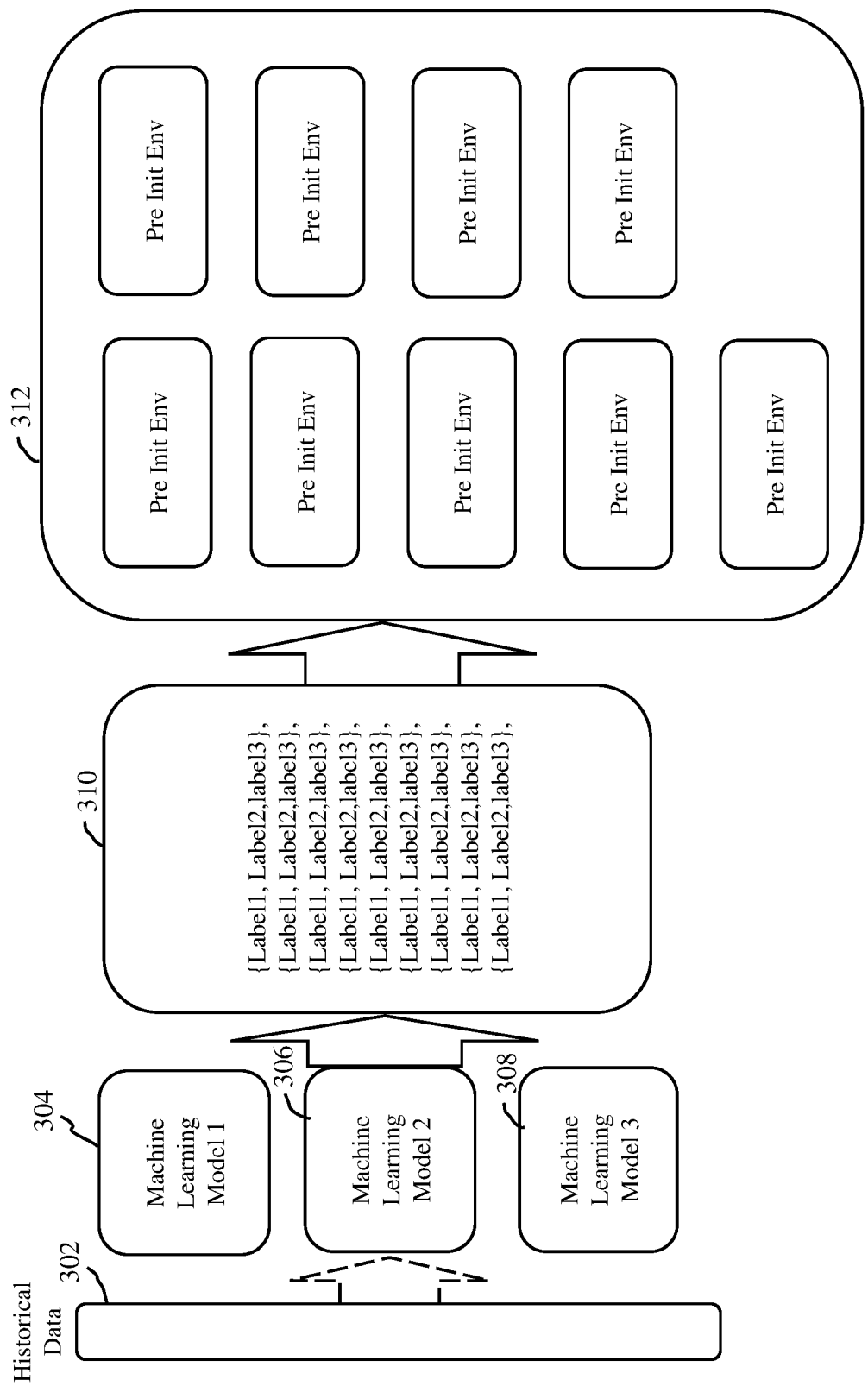
FIG. 3 is a diagram showing pre-initialization environment generation in some embodiments.

FIG. 3 is a diagram showing pre-initialization environment generation in some embodiments. Pre-initialization environment types are generated based on performance index matrix, for example, built according to a technique shown in FIG. 2. For example, machine learning models 304, 306, 308 along different dimensions of resources are trained based on historical data 302 to classify intensity levels of those dimensions, resulting in a performance matrix or index, for example, shown at 310. Historical data 302 include performance metrics or usage of resources by past applications. Those past applications' characteristics, e.g., metadata, are also used in training. Based on the performance matrix 310, candidate pre-initialization environments 312 are set up. The types of pre-initialization environment or pre-initialization environment candidates are determined based on the number of performance index types. In the example scenario shown, there are three types of performance index (e.g., high, mid, low), therefore, there can be 3^3 pre-initialization environment (dimensions ^ types). "^" symbol here denotes an exponent operator.

During runtime, one or more machine learning models are used to route incoming workload to suitable pre-initialization environment (e.g., those with appropriate hardware and/or software configuration for the workload to run), e.g., among candidate pre-initialization environment in a pool of pre-initialization environments 312. Based on, to which pre-initialization environment the incoming workload is routed, some candidate pre-initialization environment in the pool of pre-initialization environments 312 may remain idle and some pre-initialization environment in the pool of pre-initialization environments 312 may get overloaded (e.g., overheat). In such scenarios, adjustments to the pre-initialization environments in the pool may be made so that the pre-initialization environments work effectively.

Figure 4:
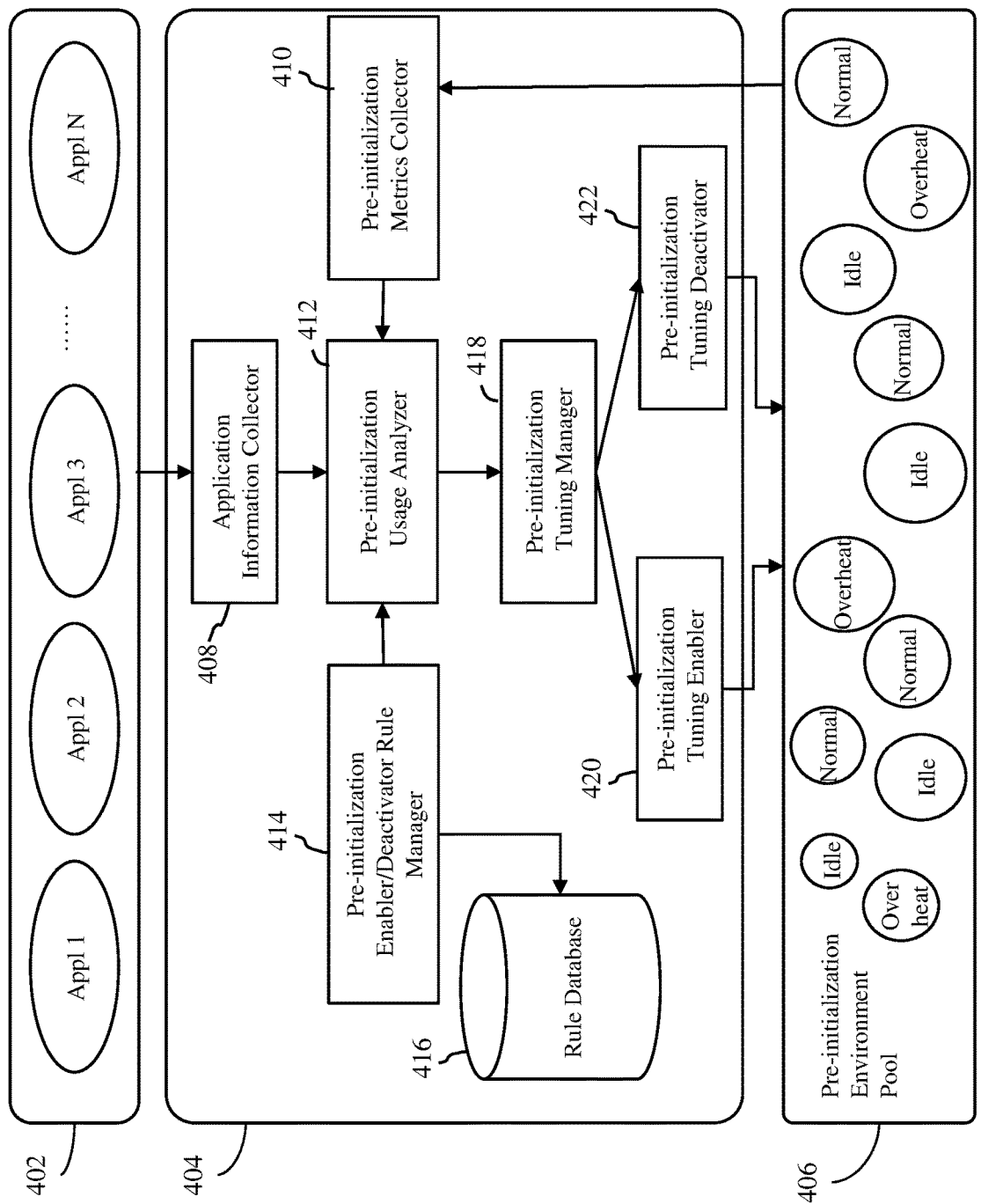
FIG. 4 is a diagram illustrating enabling of automatic tuning for a pre-initialization environment in some embodiments.

FIG. 4 is a diagram illustrating enabling of automatic tuning for a pre-initialization environment in some embodiments. If a pre-initialization environment manager identifies that a pre-initialization environment has only few of applications dispatched on it, it may mean that pre-initialization environment is not suitable for the current applications running on it. Responsive to such a finding, the pre-initialization environment automatic tuning is enabled for this pre-initialization environment. Enabling automatic tuning adds this pre-initialization environment to a tuning set. Components 402 shown are computer-implemented processes or functional modules which can be run on one or more computers or hardware processors, and function with a plurality of applications 404 (e.g., 404a, 404b, 404c, 404n) and pre-initialization environments 406. Applications 404 are workloads waiting to be run on a pre-initialization environment. A pool of pre-initialization environments 406 are those which are created, for example, as described above reference to FIG. 3.

Application information collector 408 collects application metadata from each of the applications 404 to build vectorized features or vectors for that application. Application metadata can include opcode, program strings such as symbol names, call functions, and/or other data associated with applications. Such application metadata are used to identify the application's performance, for mapping to the labels of the performance index matrix. For example, application's performance or usage with respect to performance dimensions (e.g., CPU, memory, fixed storage) can be labeled with, or mapped to, the labels of the performance index matrix, for example, described above with reference to FIG. 2. Using the mapped labels, the method decides which one of a pre-initialization environment in a pool of pre-initialization environments 406, the application should use or be routed to.

The method also collects runtime performances of the pre-initialization environment that is running the application. For example, pre-initialization metrics collector 410 collects runtime information about pre-initialization environments such as performance and usage of resources during pre-initialization environment runtime, and provides the information to pre-initialization usage analyzer 412. Based on the information, pre-initialization usage analyzer 412 identifies which pre-initialization environment is idle, which pre-initialization environment is busy (also referred to as "overheat"), and which pre-initialization environment is working effectively (also referred to as "normal"). Pre-initialization enabler and deactivator rule manager 414 can be a user interface function that interacts with users to allow users to create rules used in enabling and deactivating automatic tuning of pre-initialization environments. For instance, users create rules (or policies) based on the users' particular system or application requirements. Rules are stored in a rule database 416.

Pre-initialization usage analyzer 412 also uses the rules entered via pre-initialization enabler and deactivator rule manager 414, providing the rules to pre-initialization running manager 418. Using the rules, pre-initialization tuning manager 418 decides which one or more pre-initialization environments in the pool of pre-initialization environments 406 should be enabled for automatic tuning, triggering pre-initialization tuning enabler 420 to enable automatic tuning of those pre-initialization environment determined for automatic tuning. Using the rules, pre-initialization tuning manager 418 also decides which one or more pre-initialization environments in the pool of pre-initialization environments 406 should be removed from a tuning candidate set, triggering pre-initialization tuning deactivator 422 to deactivate automatic tuning of those pre-initialization environments determined for deactivation. For instance, pre-initialization tuning deactivator 422 removes those pre-initialization environments determined for deactivation from a list of tuning candidates (e.g., tuning candidate set).

Figure 5:
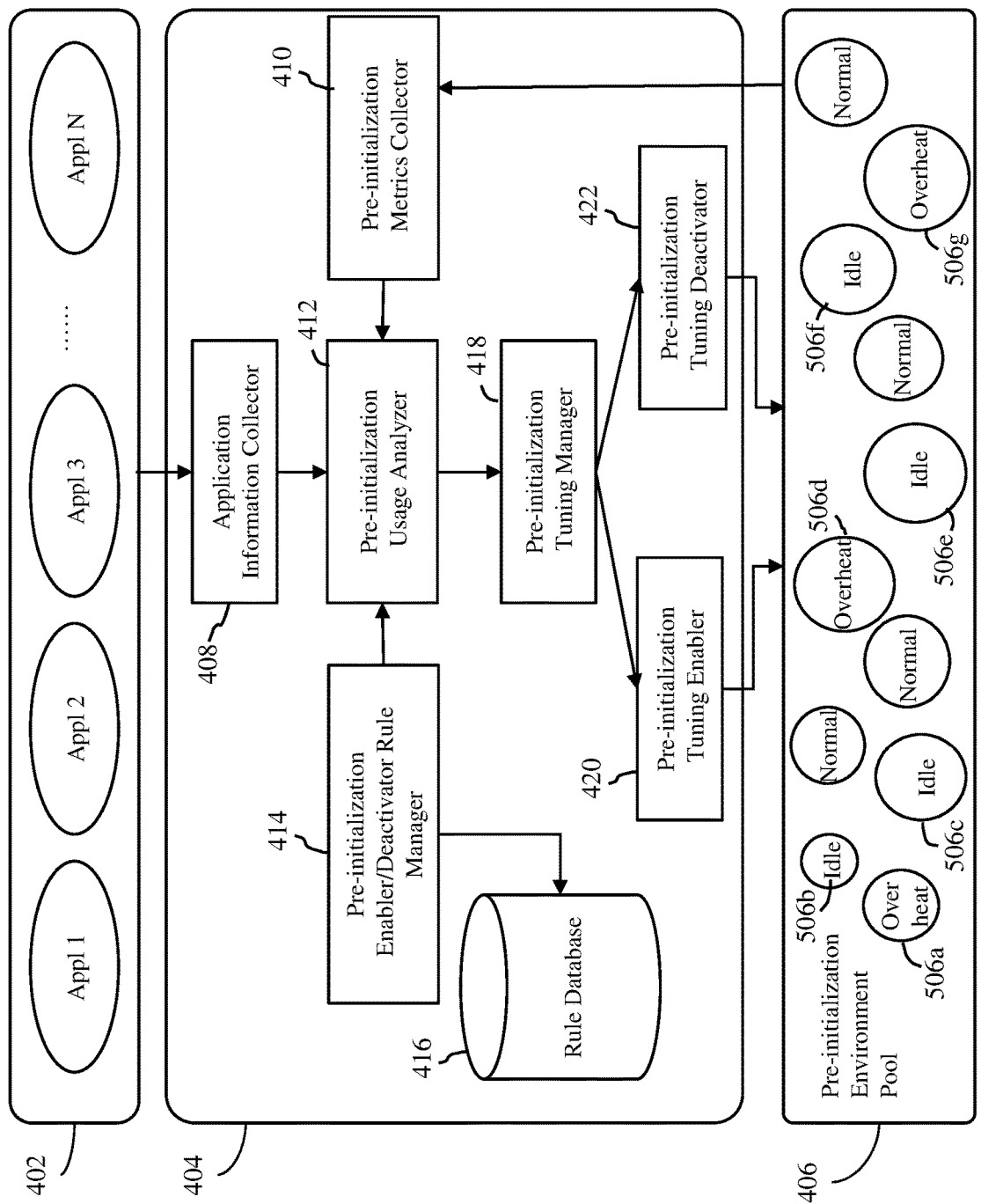
FIG. 5 is a diagram illustrating enabling of automatic tuning for a pre-initialization environment in some embodiments.

FIG. 5 is a diagram illustrating enabling of automatic tuning for pre-initialization environment in some embodiments. If pre-initialization usage analyzer 412 identifies, e.g., based on performance metrics received from pre-initialization collector 410 and one or more rules received from pre-initialization enabler/deactivator rule manager 414, that one or more pre-initialization environments in the pool of pre-initialization environments 406 are idle (e.g., 506*b*, 506*c*, 506*e*, 506*f*) or overheat (e.g., 506*a*, 506*d*, 506*g*), pre-initialization running enabler 420 enables automatic tuning of those pre-initialization environments (e.g., 506*a*, 506*b*, 506*c*, 506*d*, 506*e*, 506*f*, 506*g*). For example, those pre-initialization environments, which are idle or overheated are added to a tuning set. Those pre-initialization environments are then automatically tuned, where their hardware and/or software resource configurations are changed, for example, CPUs added or removed, memory device capacity are increased or decreased, and fixed storage amount is increased or decreased.

Figure 6:
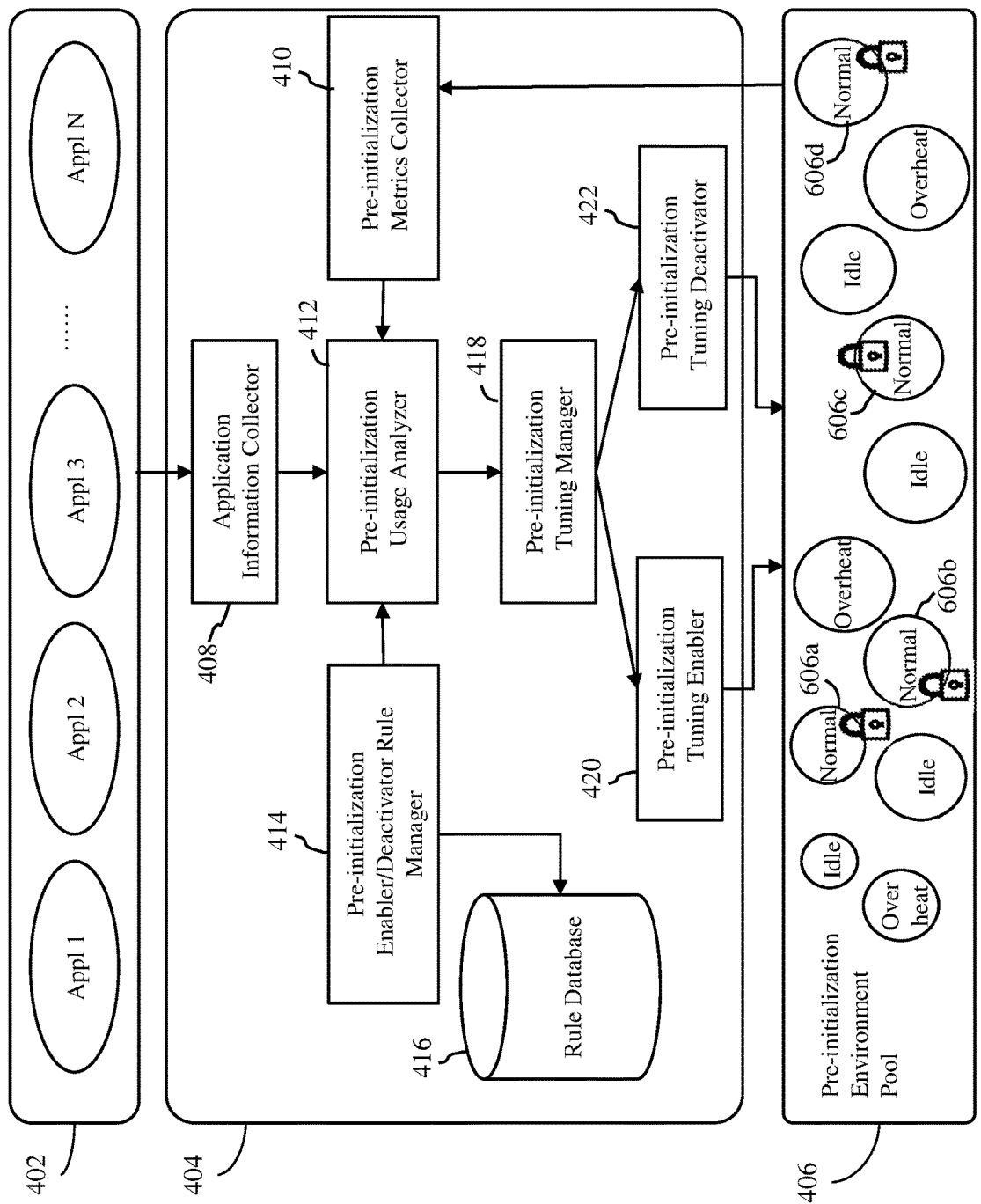
FIG. 6 is a diagram illustrating deactivating of automatic tuning for pre-initialization environment in some embodiments.

FIG. 6 is a diagram illustrating deactivating of automatic tuning for pre-initialization environment in some embodiments. If pre-initialization usage analyzer 412 identifies, e.g., based on performance metrics received from pre-initialization collector 410 and one or more rules received from pre-initialization enabler/deactivator rule manager 414, that one or more pre-initialization environments (e.g., 606*a*, 606*b*, 606*c*, 606*d*) in the pool of pre-initialization environments 406 are being efficiently used (e.g., normal), it is an indication that those pre-initialization environments (e.g., 606*a*, 606*b*, 606*c*, 606*d*) have suitable resource configurations for the current applications running on them. Therefore, it is determined that no tuning is needed for those pre-initialization environments (e.g., 606*a*, 606*b*, 606*c*, 606*d*) at this time. Pre-initialization tuning deactivator 422 deactivates automatic tuning for those pre-initialization environments (e.g., 606*a*, 606*b*, 606*c*, 606*d*). For example, pre-initialization tuning deactivator 422 removes those pre-initialization environments (e.g., 606*a*, 606*b*, 606*c*, 606*d*) from the tuning set or locks tuning options for those environments so that they will not be added to the tuning set. Deactivating automatic tuning for those pre-initialization environments (e.g., 606*a*, 606*b*, 606*c*, 606*d*) makes the system more stable.

Figure 7:
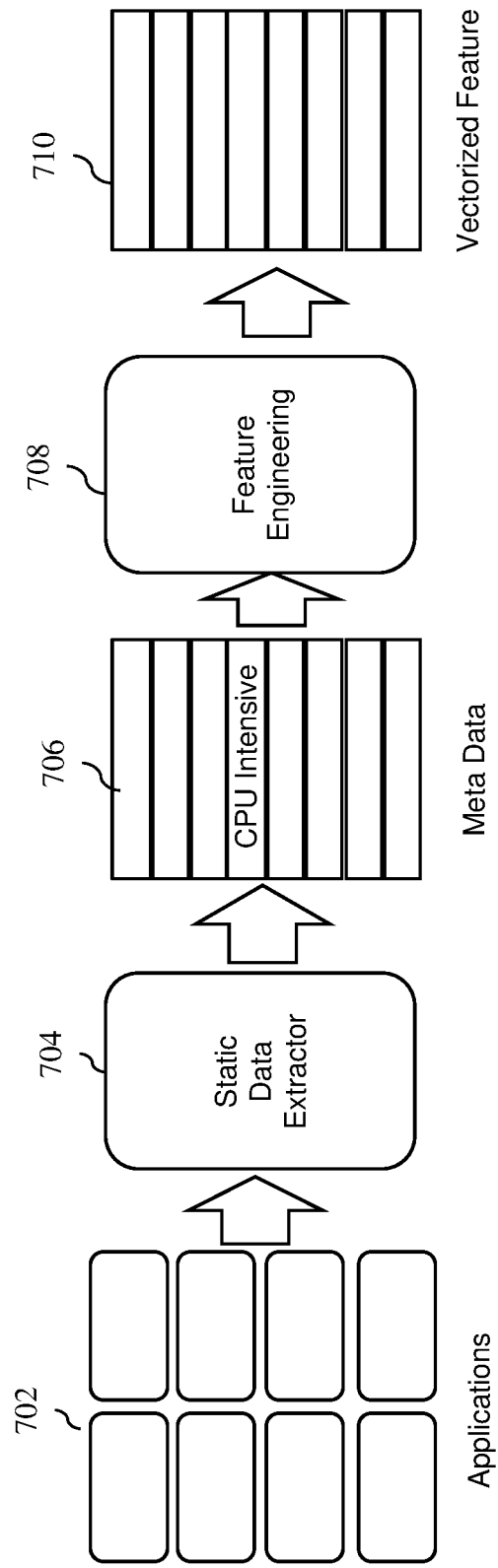
FIG. 7 is a diagram showing an application information collector in some embodiments.

FIG. 7 is a diagram showing an application information collector in some embodiments. For example, application information collector (e.g., 408 in FIG. 4) includes static data extractor function or module 704 that extracts static features or metadata 706 from applications 702 that are to run in pre-initialization environments. Examples of such static features or metadata 706 include, but are not limited to, application name, module size, import and/or export functions, symbol table, operation code n-grams, and/or others. Feature engineering function or module 708 featurizes the meta data 706 to vectorized feature 710 (e.g., vectors) so that the information can be used in one or more machine learning models. Machine learning models are classification models such as a decision tree, random forest, and/or others. Machine learning models are trained using the vectorized features 710 as training data to predict performance index. Trained machine learning models are then given as input vectorized features of an incoming application (e.g., previously unseen application by a machine learning model) for the trained machine learning model to predict or classify performance index for that incoming application.

Figure 8:
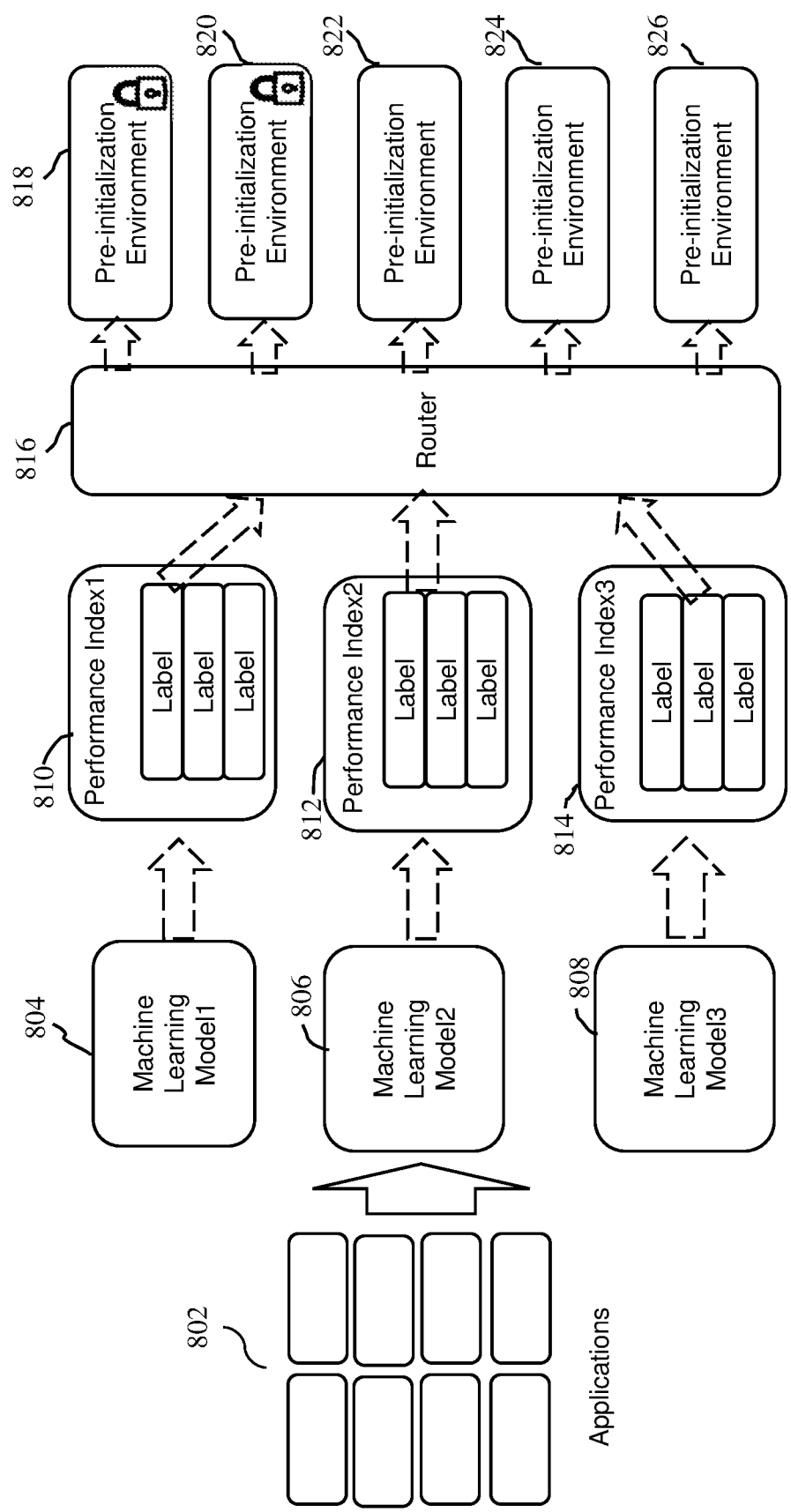
FIG. 8 is a diagram illustrating routing transactions or workload by machine learning models in some embodiments.

FIG. 8 is a diagram illustrating routing transactions or workload by machine learning models in some embodiments. Applications 802 are received by machine learning models 804, 806, 808. Examples of machine learning models 804, 806, 808 include, but are not limited to, decision tree models, random forest models, and/or others. For example, machine learning models 804, 806, 808 are classification models. Machine learning models 804, 806, 808 are those that are trained using vectorized features of applications, for example, as described above with reference to FIG. 7, to predict performance index. During runtime or inference phase of machine learning models 804, 806, 808, vectorized features of applications 802 (e.g., current workload) are received as input. Machine learning models 804, 806, 808 predict performance index 810, 812, 814 (e.g., different dimensions such as CPU usage, memory usage, fixed storage usage) for the received applications 802. By way of example, machine learning model 804 predicts whether the received current workload (application) has low, middle, or high CPU intensity or usage (e.g., 810); machine learning model 806 predicts whether the received current workload (application) has low, middle, or high memory intensity or usage (e.g., 812); machine learning model 808 predicts whether the received current workload (application) has low, middle, or high storage intensity or usage (e.g., 814). For instance, the machine learning models provide a label (high, low, mid) among label distributions for the received current workload (application). Router 816, based on the predicted performance index 810, 812, 814, routes the applications 802 to pre-initialization environments 818, 820, 822, 824, 826 respectively, which are configured appropriately for applications having those predicted performance index 810, 812, 814. Router 816 maintains a table that maps performance index to pre-initialization environments. For instance, pre-initialization environments with their resource configurations or characteristics are registered with router 816, which maintains this information in a table. Router 816 maps or matches the predicted performance index 810, 812, 814 of an application to a pre-initialization environment whose resource configuration is maintained in the table. In some embodiments, performance index can be tuned, e.g., large page, heap size, stack size, heap pool and contention, for example, based on current workload or incoming applications' performance. Trained machine learning models 804, 806, 808 are used in making decisions as to, to which pre-initialization environment, an incoming workload or application should be dispatched.

Figure 9:
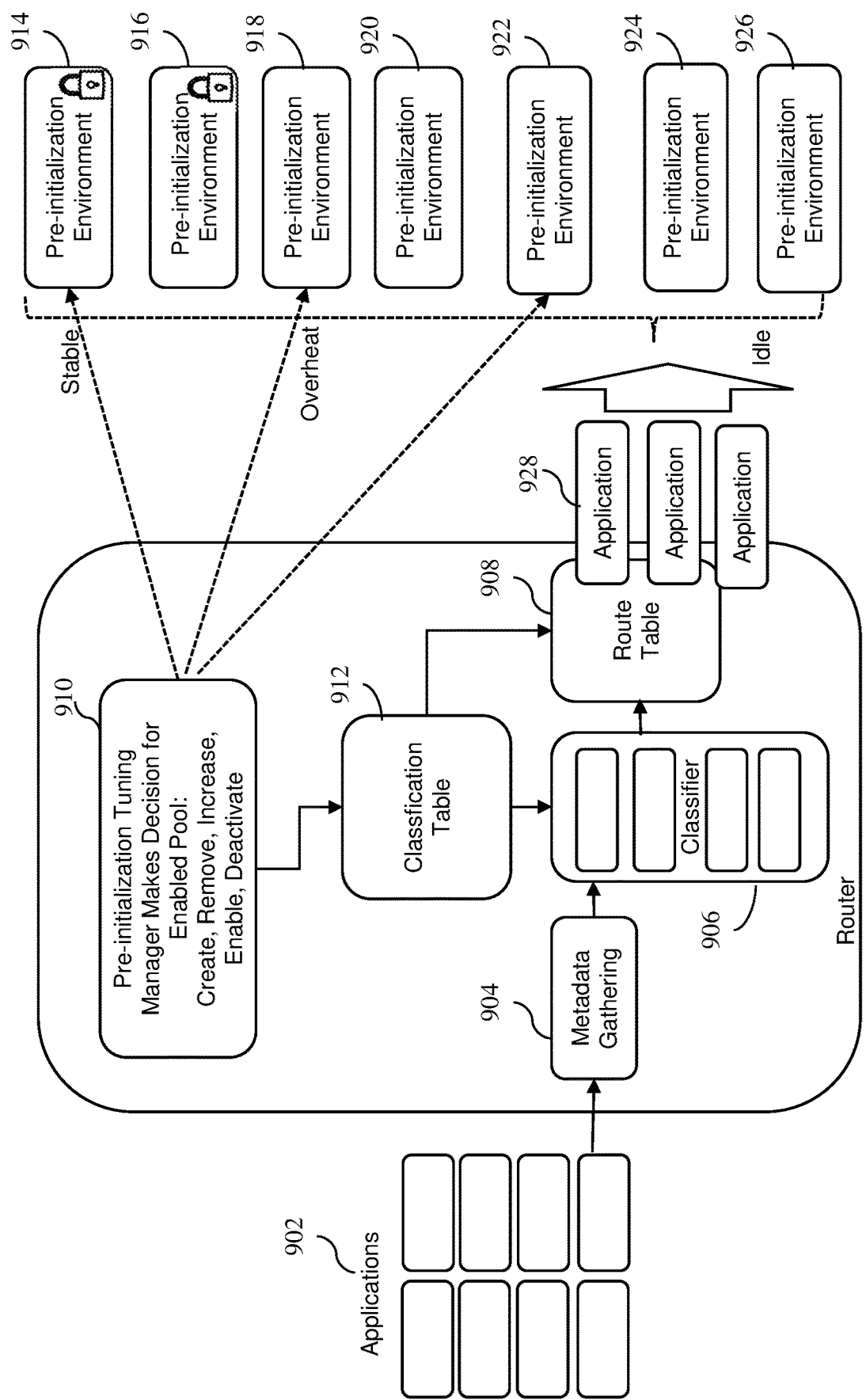
FIG. 9 is a diagram illustrating routing applications and managing pre-initialization environments in some embodiments.

FIG. 9 is a diagram illustrating routing applications and managing pre-initialization environments in some embodiments. The components shown are computer-implemented components, which include computer runtime code that can run on a computer, data storage accessible by the computer runtime code, and/or others. Metadata gathering 904 identifies, retrieves and/or collects metadata from applications 902. As part of metadata gathering 904, or as a separate function, applications' metadata are transformed into features vectors, e.g., featurized vectors or formats that a computer processor can consume and process. Machine learning models or classifiers 906 are built and trained based on feature vectors to predict performance index. Classifiers are machine learning models, for example, described above.

Route table 908 is built for classifiers and stores results of the classifiers, i.e., performance index labels of applications 928. Applications 928 are subsets of applications 902, and indicate those that are being routed. Classification table 912 stores resource configuration or characteristic (e.g., performance index label) for each pre-initialization environment in a pool of pre-initialization environments 914, 916, 918, 920, 922, 924, 926. For example, classification table 912 maintains a record of which pre-initialization environment has which performance index label. For instance, when a pre-initialization environment is created, that newly created pre-initialization environment can be added to classification table with its performance index label. Newly created pre-initialization environment and its performance index label are registered with a router that keeps the performance index label information in classification table 912. For instance, pre-initialization tuning manager 910 may maintain classification table 912. An application 928 can be mapped based on its performance index label (e.g., classified by classifiers 906) stored in route table 908 to a pre-initialization environment (e.g., one of 914, 916, 918, 920, 922, 924, 926) based on the pre-initialization environment's performance index label stored in class table 912, and routed to that pre-initialization environment. Removing a pre-initialization environment also removes that pre-initialization environment from classification table 912.

Pre-initialization tuning manager 910 makes decisions to create, remove, increase one or more pre-initialization environments. Pre-initialization tuning manager 910 also makes decisions to enable or deactivate tuning of one or more pre-initialization environments, for example, as described above. For example, for those pre-initialization environments 914, 916 that are determined as being efficiently utilized (e.g., "normal" or stable), tuning is deactivated, for example, removed from a candidate list of tuning set. For those pre-initialization environments 918, 920 that are determined to be overly busy (e.g., "overheat") and those pre-initialization environments 922, 924, 926 that are determined to be idle, pre-initialization tuning manager 910 enables tuning, for example, those pre-initialization environments are added or kept in the candidate list of tuning set. For the pre-initialization environments that are listed in the candidate list of tuning set, determinations can be made as to how those pre-initialization environments can be adjusted or tuned so that their configurations are suitable to the current workload or incoming applications. For instance, additional instances of pre-initialization environment may be created for those that are overheated; idle pre-initialization environments may be removed. Pre-initialization tuning manager 910 determines most suitable time for enabling and deactivating tuning of various pre-initialization environments.

Systems and methods, in some embodiments, enable and/or deactivate instantiated services and/or pre-initialization environments tuning automatically. In some embodiment, systems and methods tune the instantiated services and/or pre-initialization environments dynamically. In some embodiment, systems and methods associate customer requests with instantiated services automatically. In some embodiment, systems and methods provide a multiple environments selection policy for applications. In some embodiment, systems and methods provision pre-initialization environments automatically based on analyzation on static program features and performance index table.

In some embodiment, systems and methods enhance performance, improve energy efficiency and reduce costs by dynamically enabling and deactivating pre-initialization environment tuning. In some embodiments, multiple pre-initialization environment tuning can be automatically enabled or deactivated based on pre-initialization environment status and input workload changes.

Figure 10:
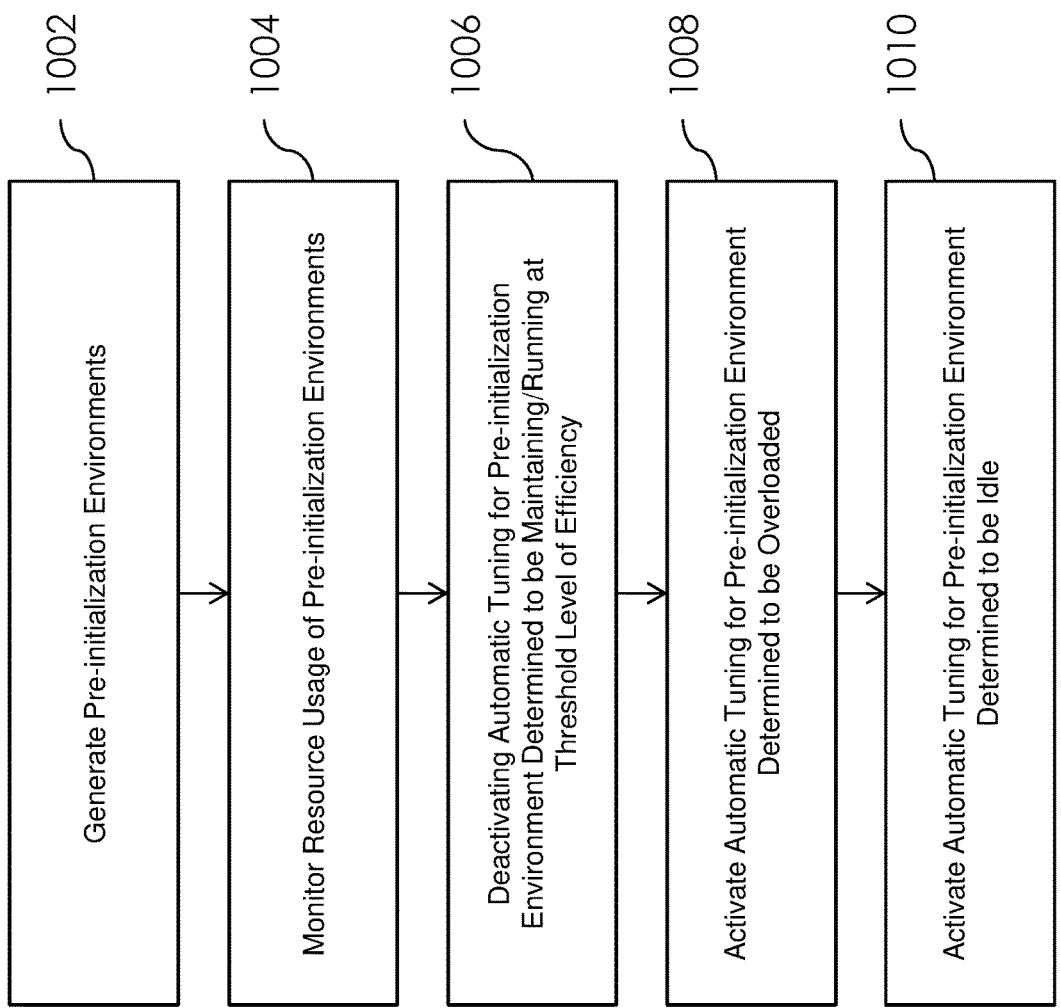
FIG. 10 is a diagram illustrating a method in some embodiments for automatically enabling and deactivating tuning of one or more pre-initialization environments.

FIG. 10 is a diagram illustrating a method in some embodiments for automatically enabling and deactivating tuning of one or more pre-initialization environments. The method can be implemented on and/or run by one or more computer processors or hardware processors, for example, described above with reference to FIG. 1. At 1002, pre-initialization environments are generated on at least one hardware processor for running incoming applications. For example, in some embodiments, as described above with reference to FIG. 2 and FIG. 3, the pre-initialization environments are generated according to label distributions of performance metrics learned by machine learning models based on historic performance data of past applications. Label distributions of performance metrics specify tuples of performance metrics along different resource dimensions, for example, as described above.

At 1004, the method includes monitoring resource usage of resources configured for the pre-initialization environments in running the incoming applications. In some embodiments, for example, the resource usage of resources configured for the pre-initialization environments in running the incoming applications, are monitored iteratively, and the deactivating and the activating of the automatic tuning occur dynamically over time.

At 1006, the method includes deactivating automatic tuning of a pre-initialization environment among the pre-initialization environments, responsive to determining based on the resource usage of resources configured for the pre-initialization environment, that the pre-initialization environment is maintaining a threshold level of efficiency. The threshold level of efficiency can be preconfigured or predetermined, and for example, specify the level (or range of levels) of resource usage at which a pre-initialization environment would be considered as running efficiently or maintaining efficiency, given its current resource configuration. For example, as described with reference to FIG. 4 and FIG. 6, automatic tuning can be deactivated for a pre-initialization environment determined to be "normal".

At 1008, the method includes activating automatic tuning of the pre-initialization environment among the pre-initialization environments responsive to determining based on the resource usage of resources configured for the pre-initialization environment that the pre-initialization environment is overloaded. For example, as described with reference to FIG. 4 and FIG. 5, automatic tuning can be activated for a pre-initialization environment determined to be "overheat". In some embodiments, activating of the automatic tuning creates an additional instance of the pre-initialization environment that is determined to be overloaded.

At 1010, the method includes activating automatic tuning of the pre-initialization environment among the pre-initialization environments responsive to determining, based on the resource usage of resources configured for the pre-initialization environment, that the pre-initialization environment is idle. In some embodiments, activating of the automatic tuning removes the pre-initialization environment that is determined to be idle, among the pre-initialization environments. In some embodiments, the deactivating and the activating of automatic tuning at 1006, 1008, and/or 1110 are further performed based on user entered rules, for example, as described with reference to FIG. 4.

In some embodiments, the method also includes running machine learning models using features associated with the incoming applications to predict performance index associated with each of the incoming applications, and based on mapping of the predicted performance index of an incoming application with resource configuration of the pre-initialization environment, routing the incoming application to the pre-initialization environment for the application to run in the pre-initialization environment. For example, as described with reference to FIG. 8 and FIG. 9, an application's predicted performance index can be used to map to a pre-initialization environment configured with resources appropriate for that predicted performance index, e.g., as indicated by label distribution associated with and used to create that pre-initialization environment.

The method presented herein in some embodiments enhances performance of a computing environment, improves energy efficiency and reduces costs by dynamically enabling and deactivating pre-initialization environment tuning. By auto-tuning a pool of pre-initialization environments, or instances thereof, in various stages, multiple pre-initialization environment tuning can be automatically enabled or deactivated based on pre-initialization environment status and input workload changes. This approach can be technically valuable for pre-initialization environment management, for both pre-initialization environment deployed in a cloud environment and in a standalone computer environment.

Figure 11:
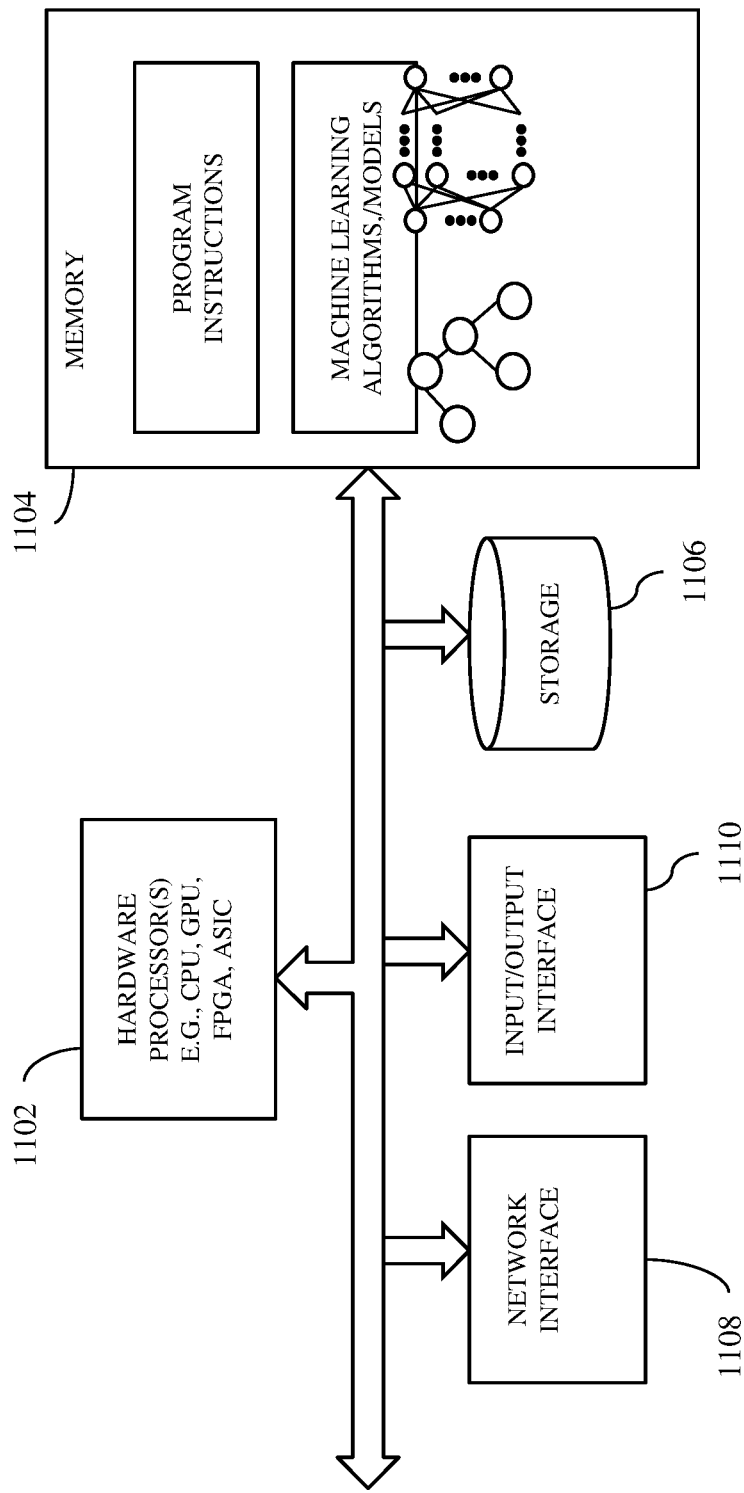
FIG. 11 is a diagram illustrating components of a system in some embodiments, which can perform automatic enabling and deactivating of tuning of one or more pre-initialization environments.

FIG. 11 is a diagram illustrating components of a system in some embodiments, which can perform automatic enabling and deactivating of tuning of one or more pre-initialization environments. One or more hardware processors 1102 such as a central processing unit (CPU), a graphic process unit (GPU), and/or a Field Programmable Gate Array (FPGA), an application specific integrated circuit (ASIC), and/or another processor, may be coupled with a memory device 1104, and generate pre-initialization environments, route applications or workload to pre-initialization environments, monitor and perform automatic activation (enabling) and deactivation or pre-initialization environments, for example, as described above. A memory device 1104 may include random access memory (RAM), read-only memory (ROM) or another memory device, and may store data and/or processor instructions for implementing various functionalities associated with the methods and/or systems described herein. One or more hardware processors 1102 may execute computer instructions stored in memory 1104 or received from another computer device or medium. A memory device 1104 may, for example, store instructions and/or data for functioning of one or more hardware processors 1102, and may include an operating system and other program of instructions and/or data. Data used by one or more hardware processors 1102 may be stored in a storage device 1106 or received via a network interface 1108 from a remote device, and may be temporarily loaded into a memory device 1104 for use. One or more hardware processors 1102 may be coupled with interface devices such as a network interface 1108 for communicating with remote systems, for example, via a network, and an input/output interface 1110 for communicating with input and/or output devices such as a keyboard, mouse, display, and/or others.

By way of example, systems and methods described herein can be used in provisioning of virtual machines, activating and deactivating tuning of configurations of computing environments in such virtual machines, and/or others.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in some embodiments" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
generating pre-initialization environments on at least one hardware processor for running incoming applications;
monitoring resource usage of resources configured for the pre-initialization environments in running the incoming applications;
deactivating automatic tuning of a pre-initialization environment among the pre-initialization environments responsive to determining, based on the resource usage of resources configured for the pre-initialization environment, that the pre-initialization environment is maintaining a threshold level of efficiency;
activating automatic tuning of the pre-initialization environment among the pre-initialization environments responsive to determining, based on the resource usage of resources configured for the pre-initialization environment, that the pre-initialization environment is overloaded;
activating automatic tuning of the pre-initialization environment among the pre-initialization environments responsive to determining, based on the resource usage of resources configured for the pre-initialization environment, that the pre-initialization environment is idle;
running machine learning models using features associated with the incoming applications to predict performance index associated with each incoming application of the incoming applications; and
based on mapping of the predicted performance index of an incoming application with resource configuration of the pre-initialization environment, routing the incoming application to the pre-initialization environment for the incoming application to run in the pre-initialization environment.

2. The computer-implemented method of claim 1, wherein the pre-initialization environments are generated according to label distributions of performance metrics learned by machine learning models based on historic performance data of past incoming applications.

3. The computer-implemented method of claim 1, wherein the resource usage of resources configured for the pre-initialization environments in running the incoming applications are monitored iteratively, and wherein the deactivating and both the activating of the automatic tuning of the pre-initialization environment among the pre-initialization environments occur dynamically over time.

4. The computer-implemented method of claim 1, wherein the activating of the automatic tuning of the pre-initialization environment among the pre-initialization environments removes the pre-initialization environment that is determined to be idle, among the pre-initialization environments.

5. The computer-implemented method of claim 1, wherein the activating of the automatic tuning of the pre-initialization environment among the pre-initialization environments creates an additional instance of the pre-initialization environment that is determined to be overloaded.

6. The computer-implemented method of claim 1, wherein the deactivating and both the activating of the automatic tuning of the pre-initialization environment among the pre-initialization environments are performed based on user entered rules.

7. A computer program product comprising a computer readable storage medium having program instructions embodied therewith, the program instructions readable by a device to cause the device to:
generate pre-initialization environments on at least one hardware processor for running incoming applications;
monitor resource usage of resources configured for the pre-initialization environments in running the incoming applications;
deactivate automatic tuning of a pre-initialization environment among the pre-initialization environments responsive to determining, based on the resource usage of resources configured for the pre-initialization environment, that the pre-initialization environment is maintaining a threshold level of efficiency;
activate automatic tuning of the pre-initialization environment among the pre-initialization environments responsive to determining, based on the resource usage of resources configured for the pre-initialization environment, that the pre-initialization environment is overloaded;
activate automatic tuning of the pre-initialization environment among the pre-initialization environments responsive to determining, based on the resource usage of resources configured for the pre-initialization environment, that the pre-initialization environment is idle;
run machine learning models using features associated with the incoming applications to predict performance index associated with each incoming application of the incoming applications; and
based on mapping of the predicted performance index of an incoming application with resource configuration of the pre-initialization environment, route the incoming application to the pre-initialization environment for the incoming application to run in the pre-initialization environment.

8. The computer program product of claim 7, wherein the pre-initialization environments are generated according to label distributions of performance metrics learned by machine learning models based on historic performance data of past incoming applications.

9. The computer program product of claim 7, wherein the resource usage of resources configured for the pre-initialization environments in running the incoming applications are monitored iteratively, and wherein the deactivating and both the activating of the automatic tuning of the pre-initialization environment among the pre-initialization environments occur dynamically over time.

10. The computer program product of claim 7, wherein the device caused to activate the automatic tuning of the pre-initialization environment among the pre-initialization environments causes removing of the pre-initialization environment that is determined to be idle, among the pre-initialization environments.

11. The computer program product of claim 7, wherein the device caused to activate the automatic tuning of the pre-initialization environment among the pre-initialization environments causes creating an additional instance of the pre-initialization environment that is determined to be overloaded.

12. The computer program product of claim 7, wherein the deactivating and both the activating of automatic tuning of the pre-initialization environment among the pre-initialization environments are performed based on user entered rules.

13. A system comprising:
at least one computer processor; and
at least one memory device coupled with the at least one computer processor;
the at least one computer processor configured to at least:
generate pre-initialization environments on at least one hardware processor for running incoming applications;
monitor resource usage of resources configured for the pre-initialization environments in running the incoming applications;
deactivate automatic tuning of a pre-initialization environment among the pre-initialization environments responsive to determining, based on the resource usage of resources configured for the pre-initialization environment, that the pre-initialization environment is maintaining a threshold level of efficiency;
activate automatic tuning of the pre-initialization environment among the pre-initialization environments responsive to determining, based on the resource usage of resources configured for the pre-initialization environment, that the pre-initialization environment is overloaded;
activate automatic tuning of the pre-initialization environment among the pre-initialization environments responsive to determining, based on the resource usage of resources configured for the pre-initialization environment, that the pre-initialization environment is idle;
run machine learning models using features associated with the incoming applications to predict performance index associated with each incoming application of the incoming applications; and
based on mapping of the predicted performance index of an incoming application with resource configuration of the pre-initialization environment, route the incoming application to the pre-initialization environment for the incoming application to run in the pre-initialization environment.

14. The system of claim 13, wherein the pre-initialization environments are generated according to label distributions of performance metrics learned by machine learning models based on historic performance data of past incoming applications.

15. The system of claim 13, wherein the resource usage of resources configured for the pre-initialization environments in running the incoming applications are monitored iteratively, and wherein the deactivating and both the activating of the automatic tuning of the pre-initialization environment among the pre-initialization environments occur dynamically over time.

16. The system of claim 13, wherein the at least one computer processor activating the automatic tuning of the pre-initialization environment among the pre-initialization environments causes removing of the pre-initialization environment that is determined to be idle, among the pre-initialization environments.

17. The system of claim 13, wherein the at least one computer processor activating the automatic tuning of the pre-initialization environment among the pre-initialization environments causes creating an additional instance of the pre-initialization environment that is determined to be overloaded.

* * * * *